US009503496B2

(12) United States Patent
Rooks et al.

(10) Patent No.: US 9,503,496 B2
(45) Date of Patent: Nov. 22, 2016

(54) SYSTEM AND METHOD FOR A MEDIA CONTENT RECONCILER (75) Inventors: Kelsyn Rooks, Overland Parks, KS (US); David E. Emerson, Overland Park, KS (US); Gary W. Lafreniere, Olathe, KS (US); Michael S. Goergen, Bend, OR (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1596 days.

(21) Appl. No.: 12/499,457

(22) Filed: Jul. 8, 2009

(65) Prior Publication Data
US 2011/0010431 A1    Jan. 13, 2011

(51) Int. Cl.
G06F 15/16 (2006.01)
H04L 29/06 (2006.01)
G06F 17/30 (2006.01)

(52) U.S. Cl.
CPC ......... H04L 65/605 (2013.01); G06F 17/3002 (2013.01); H04L 65/4076 (2013.01)

(58) Field of Classification Search
CPC ............... H04H 2201/90; H04H 60/37; H04H 60/40; H04H 60/59; H04L 2209/60; H04L 65/4076; H04L 65/605; H04N 21/23418; H04N 21/44204; H04N 21/4532; H04N 21/4622; H04N 21/482; H04N 5/44543; G06F 17/3002
USPC ........................................................ 709/218
See application file for complete search history.

(56) References Cited

U.S. PATENT DOCUMENTS

| | | | |
|---|---|---|---|
| 6,425,012 B1 | 7/2002 | Trovato et al. | |
| 7,006,616 B1 | 2/2006 | Christofferson et al. | |
| 7,478,414 B1 * | 1/2009 | Glusker et al. | 725/9 |
| 7,634,790 B2 | 12/2009 | Finseth et al. | |
| 7,788,695 B2 | 8/2010 | Walter et al. | |
| 7,870,216 B2 | 1/2011 | Patron et al. | |
| 7,890,638 B2 | 2/2011 | Benco et al. | |
| 2001/0027562 A1 * | 10/2001 | Schein et al. | 725/43 |
| 2002/0186320 A1 * | 12/2002 | Carlsgaard et al. | 348/468 |
| 2003/0005448 A1 | 1/2003 | Axelsson et al. | |
| 2003/0078972 A1 | 4/2003 | Tapissier et al. | |
| 2004/0194146 A1 | 9/2004 | Bates et al. | |

(Continued)

OTHER PUBLICATIONS

TV Guide Listings, Jul. 8, 2009, www.tvguide.com/Listings/default.aspx.

(Continued)

*Primary Examiner* — Christopher Biagini
(74) *Attorney, Agent, or Firm* — Swanson & Bratschun, L.L.C.

(57) ABSTRACT

A system and method for reconciling media content available through a number of service providers. A request is received to identify media content. One or more characteristics of the media content are determined. A determination is made whether the media content is associated with an identifier in response to the one or more characteristics. An identifier is associated with the media content in response to determining there is not an existing identifier associated with the media content. The media content is cross referenced between the number of service providers utilizing the identifier and time zones. A database is updated to include the identifier and the one or more characteristics associated with the media content.

20 Claims, 5 Drawing Sheets (56) References Cited

U.S. PATENT DOCUMENTS

| | | | |
|---|---|---|---|
| 2004/0231003 A1 | 11/2004 | Cooper et al. | |
| 2005/0141542 A1 | 6/2005 | Handekyn et al. | |
| 2005/0262542 A1 | 11/2005 | DeWeese et al. | |
| 2006/0140169 A1 | 6/2006 | Soundararajan | |
| 2006/0150214 A1* | 7/2006 | Ramraz et al. | 725/44 |
| 2006/0190966 A1 | 8/2006 | McKissick et al. | |
| 2006/0271959 A1* | 11/2006 | Jacoby et al. | 725/46 |
| 2007/0169165 A1 | 7/2007 | Crull et al. | |
| 2008/0098313 A1 | 4/2008 | Pollack | |
| 2008/0111699 A1 | 5/2008 | Kwon et al. | |
| 2008/0115164 A1 | 5/2008 | Kiiskinen | |
| 2008/0168491 A1 | 7/2008 | Carlson et al. | |
| 2008/0222295 A1 | 9/2008 | Robinson et al. | |
| 2008/0255977 A1 | 10/2008 | Altberg et al. | |
| 2009/0030792 A1* | 1/2009 | Khivesara et al. | 705/14 |
| 2009/0037470 A1 | 2/2009 | Schmidt | |
| 2009/0113480 A1 | 4/2009 | Allard et al. | |
| 2009/0133070 A1 | 5/2009 | Hamano et al. | |
| 2009/0214191 A1* | 8/2009 | Allard | 386/124 |
| 2009/0293079 A1 | 11/2009 | McKee et al. | |
| 2010/0158391 A1* | 6/2010 | Cunningham et al. | 382/209 |
| 2010/0199340 A1 | 8/2010 | Jonas et al. | |
| 2010/0306239 A1* | 12/2010 | Littlejohn et al. | 707/769 |
| 2010/0319034 A1 | 12/2010 | Mountain | |
| 2011/0067066 A1 | 3/2011 | Barton et al. | |

OTHER PUBLICATIONS

Hansell, Saul, "Inaugurating Social TV", The New York Times, Jan. 20, 2009 (2 pages).

* cited by examiner

| | Content Reconciler GUI 500 | | | | |
|---|---|---|---|---|---|
| 502 | | | | | |

| | | Provider 508 | Channel 510 | Content Identifier 512 | Date & Time Zone 514 | Contacts 516 |
|---|---|---|---|---|---|---|
| Media Content 506 | | Generic Cable | Past Events | 1XR5DSFPHD | 6/21/12 10:00 p.m. CST | Darrenmeister John G. Frenchy |
| | | Unfetch Cable | Lost and Found | 1XR5DSFPHD | 6/21/12 9:00 p.m. MST | WillH HyunhN |
| | | Horizen Communications | Past Events | | | Cristie77 |
| | | BU&U Communications | Channel 32 | 1XR5DSFPHD | 6/21/12 11:00 p.m. EST | Afganhi, Lafrinator |
| | | Decade Connection | Historical Information | 1XR5DSFPHD | 6/22/12 10:00 p.m. PST | Joe11232 |
| | | Dynamiccomm | Past Events 3 | | | |
| | | GoldSun Comms. | Channel 235 | 1XR5DSFPHD | 6/21/12 10:30 p.m. CST | WilmaV |
| | | College NetServices | Lost and Found | 1XR5DSFPHD | 6/24/12 6:00 p.m. MST | Vautrot6 |

504

| | | Providers 520 | Channels 522 | | |
|---|---|---|---|---|---|
| Lost and Found Channel 518 | | Generic Cable | Channel 32-2 Past Events | Channel 32-1 Past Events HD | Darrenmeister John G. Frenchy |
| | | Unfetch Cable | Channel 0003 Lost and Found | | WillH HyunhN |
| | | Horizen Communications | Channel 543 Past Events | Channel 544 Past Events HD | Cristie77 |

SYSTEM AND METHOD FOR A MEDIA CONTENT RECONCILER

BACKGROUND

The use of and distribution of media content has grown nearly exponentially in recent years. The growth is fueled by larger networks with more reliable protocols and better communications hardware available to service providers and consumers. Similarly, users now have more options for both generating and viewing different types of media content.

Existing channel guides provide limited access to information and data. In some cases, identifying media content available across multiple service providers, networks, and time zones is very difficult.

SUMMARY

One embodiment provides a system and method for reconciling media content available through a number of service providers. A request may be received to identify media content. One or more characteristics of the media content may be determined. A determination may be made whether the media content is associated with an identifier in response to the one or more characteristics. An identifier may be associated with the media content in response to determining there is not an existing identifier associated with the media content. The media content may be cross referenced between the number of service providers utilizing the identifier and time zones. A database may be updated to include the identifier and the one or more characteristics associated with the media content.

Another embodiment provides a system for a media content reconciler. The media content reconciler may include a network interface operable to receive a number of requests to identify a plurality of media content. The media content reconciler may also include reconciler logic in communication with the network interface. The reconciler logic may be operable to determine one or more characteristics of each the number of media content, determine if each of the number of media content is associated with an identifier in response to the one or more characteristics, associate an identifier with the media content in response to determining there is not an existing identifier associated with the media content, and cross reference the media content between the number of service providers utilizing the identifier and time zones. The media content reconciler may also include a database in communication with the reconciler logic. The database may be operable to store a number of identifiers, each of which is associated with one of a number of media content.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for reconciling media content between multiple communications service providers. Media content as herein defined is channels, programs, video clips, presentations, movies, channels, music, stations, or other media content that may be communicated to a user for display or output through a display. The media content may be communicated by one or more communications service providers. The display is a visual, audio, and/or tactile output device for communicating the media content to a user. For example, the display may be a television, radio, Braille pad, computer, monitor, projector, speakers, and other similar media interface devices.

The communications service providers are content providers that generate and/or distribute media content end-users and other service providers. The media content may be reconciled from a single point in a centralized configuration or utilizing any number of distributed communications architectures. In one embodiment, the identity and cross-referencing of media content may be performed collaboratively in utilizing a wiki-style format.

In one embodiment, media content may be reconciled for communications and features performed across social networking sites. For example, in many cases, users, contacts, or groups may wish to watch media content, such as a baseball game simultaneously or on the same day. As a result, the contacts or social networking site may need to coordinate when the game is played to each of the contacts. For example, the time zones, service providers, and channels the game is played on may vary for each contacts. As a result, the content reconciler may identify the media content and translate requests to identify the game from one contact to the next. The content reconciler may even identify that the game is not available to all contacts based on their programming bundle, service provider, or time zone.

In another embodiment, the time the media content, such as a television show, may vary based on the location, region, address, or zip code of the contact. As a result, the contacts may send links, invitations, or other requests to discuss the television show once all the contacts have had the opportunity to view the television show based on their location. In some cases, discussions for media content may be filtered or blocked until a particular contact has had a chance to view the media content without learning results or outcomes through social networking chats, discussions, messaging, forums, or calls.

In another embodiment, the content reconciler may be utilized by a user to determine the relevant channel and time for favorite content. For example, a user may utilize a Blackberry to look up a channel and time for a television program based on the location, address, and/or local service provider. Additionally, requests sent to a user in an email, chat, or text message to view a breaking news update may be translated automatically or selectively. The cross reference information may also be utilized to cross-reference related high definition and standard definition content. The cross-reference information may also be utilized when allowing a user to program another users digital video recorder.

Figure 1:
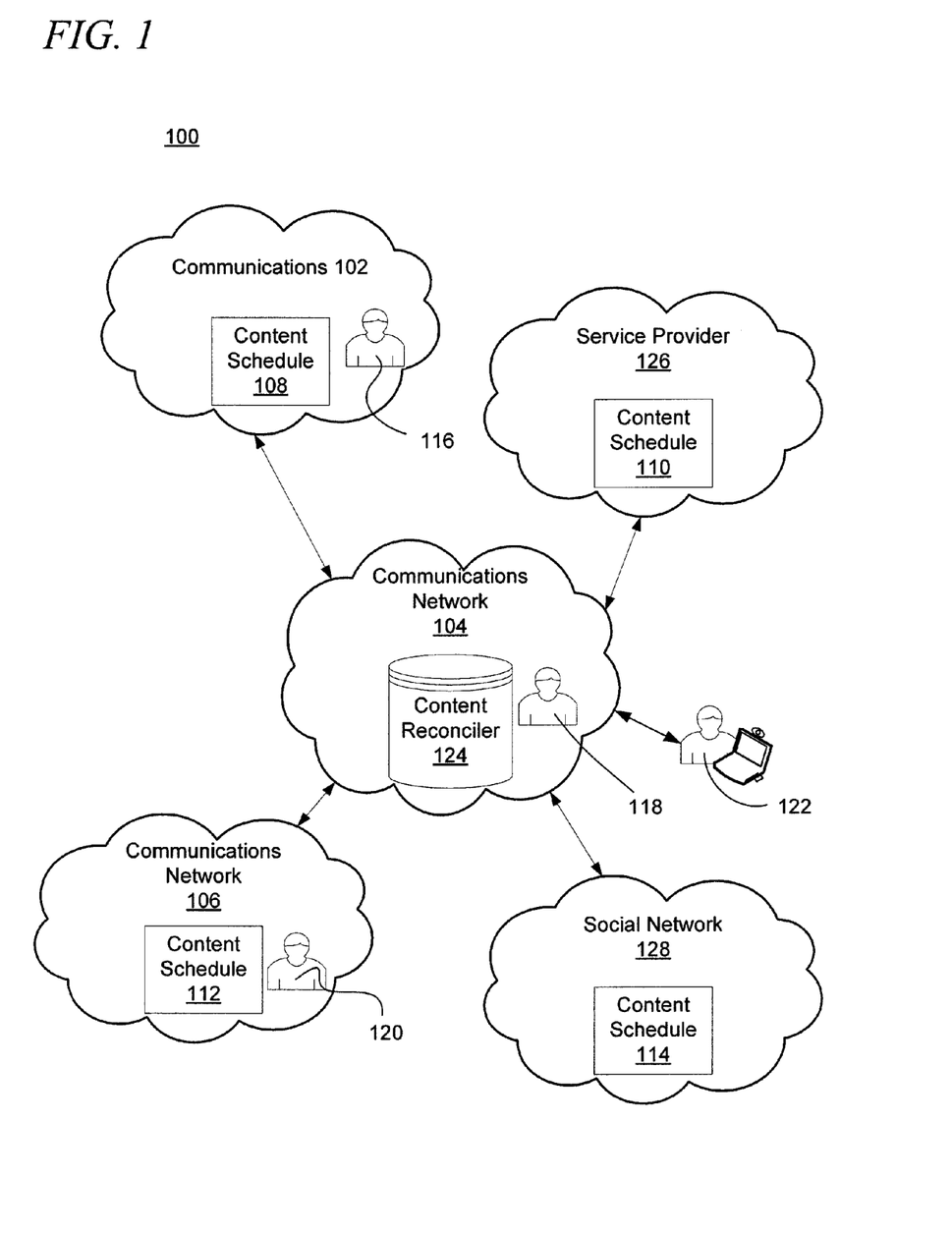
FIG. 1 is a pictorial representation of a communications environment in accordance with an illustrative embodiment.

FIG. 1 is a pictorial representation of a communications environment in accordance with an illustrative embodiment.

FIG. 1 shows one possible configuration of a communications environment 100. The communications environment 100 is any number or combination of communications and media systems, equipment, devices, users, providers, networks and other elements that may view, monitor or carry on communications about media content. The communications environment 100 may include any number of elements including but not limited to communications networks 102, 104 and 106, content schedules 108, 110, 112 and 114, content administrators 116, 118 and 120, user 122, content reconciler 124, service provider 126 and social network 128.

Communications within the communications environment 100 may occur on any number of networks which may include wireless networks, data or packet networks, cable networks, satellite networks, private networks, and publicly switched telephone networks (PSTN). The features of the embodiments may be implemented by one or more elements of the communications environments 100 independently or as a networked implementation.

The communications environment 100 may further include any number of hardware and software elements that may not be shown in the example of FIG. 1. For example, the communications environment 100 may include exchanges, switches, antennas, towers, switching centers, routers, application servers, media servers, service brokers, call agents, edge routers, gateways (signaling, trunking, access, sub, etc.), IP network service providers, adapters, exchanges, switches, users, and networks.

In one embodiment, the communications networks 102, 104 and 106 as well as the service provider 126 and social network 128 may represent distinct or separate entities that provide or perform any number of connections or services for users that are integrated or communicate with each. For example, communications network 102 may be a nationwide communications service provider providing analog, digital, voice over internet protocol (VoIP), wireless data and other communications services and features to millions of users. In another example, communications network 106 may represent a regional provider that represents a much smaller region but similarly provides services to users that communicate with the communications network 106.

The content schedules 108, 110, 112 and 114 are the objects, modules or devices that store information, data, details and text regarding media content available through the communications network 102, the service provider 126, the communications network 106, and the social network 128, respectively. For example, the content schedules 108, 110, 112 and 114 may be stored in a database that may be displayed to one or more users or other parties through a graphical user interface, dedicated channel, printed channel guide or other similar element. In one embodiment, the media content available and listed on the content schedules 108, 110, 112 and 114 may differ between the different entities. For example, the configuration of movies, television programs, video clips, Pay-Per-View programming and other media content may be the same, partially the same, or completely different. For example, the communications network 102 may display a public television program on channel 13, whereas the communications network 106 may display the same content on channel 121.

The content administrators 116 and 120 may be one or more users, personnel, network operators or other administrators that monitor and manage the content schedules 108 and 112, respectively. For example, the content administrators 116, 118 and 120 may ensure that the media content listed is correct and may manually insert programming and scheduling details as needed based on the capabilities, automation and configurations of the communications network 102 and the communications network 106. The content administrator 116, 118, and 120 may represent an individual user or groups of users that collaboratively update the media content. The content administrator 118 may perform the various determinations and associations being described. Alternatively, the content administrator 118 may verify and/or trouble shoot actions performed by the content reconciler 124.

In another embodiment, the content administrators 116, 118, and 120 may be applications or logic that automatically update the media content available through their respective communications networks 102, 104, and 106. For example, the content administrators 116, 118 and 120 may represent servers and databases that update media content as the schedule and programming is established.

The service provider 126 and the social network 128 represent new types of media content delivery including internet protocol television (IPTV), social networking, content delivery sites (such as YouTube, Hulu, Amazon and others), wireless media content providers and other alternative providers, systems and networks including individual users that may deliver media content.

The user 122 represents a single user that may access the communications network 104 and corresponding content reconciler 124 through a computer, laptop, wireless device, personal digital assistant (PDA) or other communications device. The user 122 may generate media content or reconcile media content. For example, the user 122 may generate programming and request to verify media content delivered to one or more contacts, friends, or groups associated with the user 122.

The communications network 104 represents a service provider or a network point that accesses and stores the media content available from the numerous sources shown in the communications environment 100. For example, the communications network 104 may represent an integrated service or collaboration between numerous service providers that identifies, stores, cross references and reconciles media content available through the communications network 102, the service provider 126, the communications network 106, the social network 128 and the user 122.

The content reconciler 124 is a logical device that is operable to independently identify the media content available through the entities of the communications environment 100. In one embodiment, the content reconciler is an application specific integrated circuit, field programmable gate array, customized processor, or chip with circuitry and digital logic (i.e. NAND, AND, and OR gates) operable to identify the media content utilizing unique characteristics, determine whether an identifier exists for the media content, and then categorize the media content based on previous categorizations or requirements for new media content. The content reconciler 124 may be a server operable to perform the identifications, determinations, and storage of information for media content and then store the media content in one more databases, web servers, or other memories that may be accessible to users as needed or based on a subscription or access plan. As a result, the content reconciler 124 may represent a system of devices that are networked together or otherwise integrated locally or remotely to track media content being played or scheduled for each of the networks, providers, and users of the communications environment 100.

Once identified, the media content is associated or marked with a content identifier that is from that point thereon associated with the media content. As a result, any number of communications networks, service providers, users and others may retrieve information based on individual requests about media content. The request for information may be reconciled based on service provider, channel, time zone, contacts of one or more users and other criteria that are not currently available for reconciling media content. In one embodiment, the communications networks 102 and 106, service provider 126, social network 128 and user 122 may be charged an access fee to retrieve and view the information, details and data stored by the content reconciler 124.

The content reconciler 124 may be accessed via any number of communications devices including wireless and wireline devices. Streaming communications or discrete messages, such as email, text messages, and other communications may be utilized to access the content available through the content reconciler 124.

Figure 2:
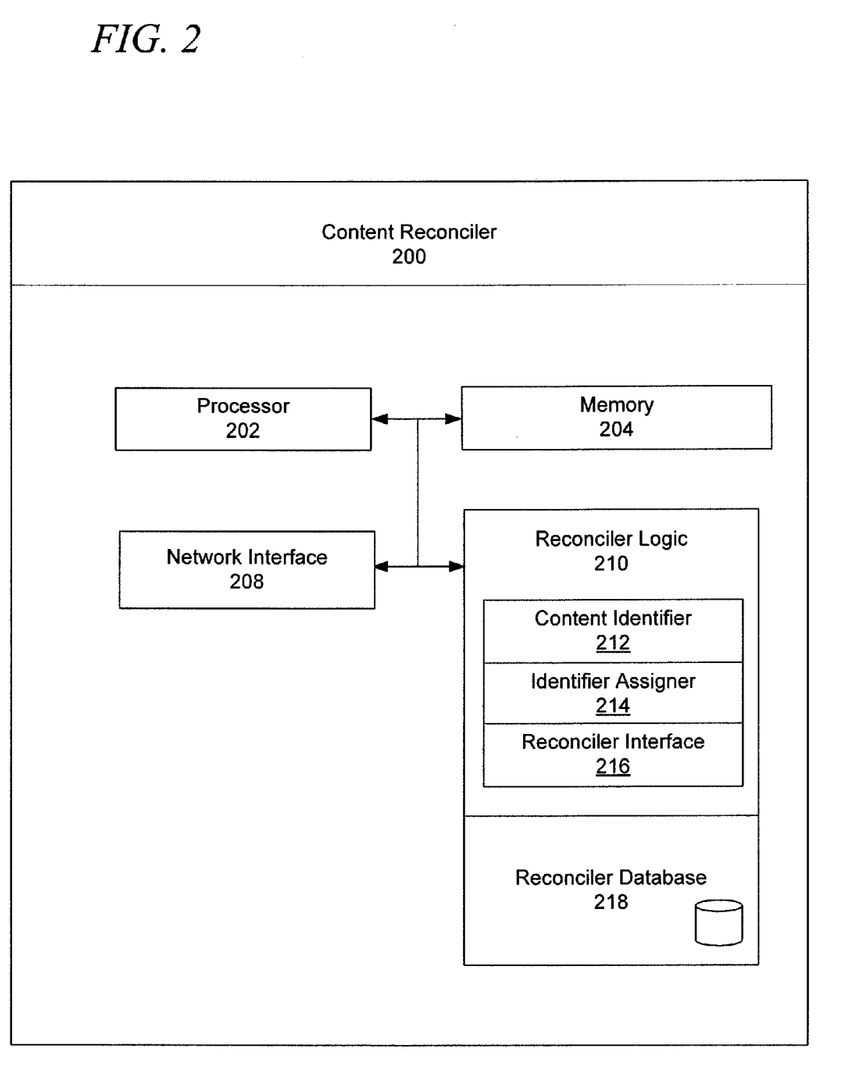
FIG. 2 is a block diagram of a content reconciler in accordance with an illustrative embodiment.

FIG. 2 is a block diagram of a content reconciler in accordance with an illustrative embodiment. FIG. 2 illustrates an embodiment of a content reconciler 200. The content reconciler 200 is a particular implementation of the content reconciler 124 of FIG. 1. The content reconciler may include any number of computing and telecommunications components, devices or elements which may include busses, motherboards, circuits, ports, interfaces, cards, converters, adapters, connections, transceivers, displays, antennas, and other similar components. The content reconciler 200 includes a processor 202, a memory 204, a network interface 206, reconciler logic 210, a content identifier 212, an identifier assigner 214, a reconciler interface 216 and a reconciler database 218.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

In another embodiment, the content reconciler 200 may be a communications management system. A communications management system is one or more devices utilized to enable, initiate, route, and manage media, voice, and data communications between one, or more communications devices. The communications management system may include one or more devices networked to manage the communications networks. For example, the communications management system may include any number of servers, routers, switches, or advanced intelligent network devices. The communications networks sends and receives the electronic signals through any number of transmission mediums. The communications network may include various fiber optics, cables, transmission towers, antennas, or other elements for transmitting voice communications to the connected telephonic devices.

The network interface 206 is an interface for communicating with a number of communications service providers, networks, users, systems, devices, entities and other parties. The network interface 206 may include any number of ports, communications lines or other elements. For example, the network interface 206 may include a portal for communicating with each of the larger communications networks and service providers to ensure that a dedicated connection is available for adding, updating and storing the media content available in the reconciler database 218. A portal may be a web site that functions as a central point of access to information on the Internet or an intranet. The portal may be accessed from any computing or communications system or device enabled to communicate through a network connection.

The elements of the content reconciler 200 may be implemented entirely in hardware. In another embodiment, the reconciler logic 210 and other elements may be software modules that are stored in the memory 204 for execution by the processor 202. Alternatively, the content reconciler 200 may be a combination of hardware, software and firmware elements that perform the processes, features and other described elements of the illustrative embodiments.

The reconciler logic 210 is the logic and logical elements operable to identify media content, assign a content identifier and reconcile the media content between providers, channels, time zones and based on other information or options including friends or contacts of a user.

The determination, identification and cross references determined by the reconciler logic 210 may be stored in the reconciler database 218 for subsequent retrieval by any number of users, parties or entities. Requests to identify media content and the subsequent answers or automatically generated responses may be channeled from the network interface 206 to the reconciler logic 210 and the reconciler database 218.

The content identifier 212 is logic operable to determine whether media content from numerous networks, servers, and providers has previously been identified. If the media content has an existing identifier, the media content and content identifier may be associated. If the content has never been identified before, a new identifier is associated with the media content. The content identifier 212 may also determine unique characteristics of the media content. The characteristics may involve looking at metadata stored within the media content itself, a digital fingerprint of the media content, optical image or character recognition of all or portions of the media content. In another embodiment, digital rights management information, title data or characterization by a service provider of the media content may be utilized to identify the media content.

The identifier assigner 214 may manage assignment and association of content identifiers with media content. The identifier assigner 214 may utilize a content identifier that is independent of service providers or networks. As a result, no bias or preferential treatment may be shown to larger service providers or other entities. In particular, the identifier assigner 214 may determine whether an existing identifier is available or whether a new identifier needs to be assigned. The identifier assigner 214 may ensure that identical media content is stored under the same content identifier for proper cross referencing between multiple service providers. In one embodiment, the identifier assigner 214 may utilize decimals, dashed numbers, letters or other elements to indicate that the media content is a standard definition or a high definition representation of the media content. Media content that shares common music, sample images or other content may also be annotated and/or cross-referenced.

The reconciler interface 216 is the logic operable to cross reference media content between service providers and networks. The reconciler interface 216 may generate any number of user interfaces, portals or other similar interface elements for receiving and displaying media content information. In one embodiment, the reconciler interface 216 of the reconciler logic 210 may be accessed in order to determine whether a user seeking to switch communications service providers will have access to all of the media content frequently watched by the user. For example, the user may have children that enjoy watching particular public radio and cartoon stations and as a result the user may ensure that those channels or programs are included in the new service before the user is willing to change service providers, programming content or bundles.

The reconciler interface 216 may provide a search of a query interface for one or more users to access the reconciler database 218. The user may search utilizing common interest or browser searches along with the ability to correlate the search to contacts, users, groups, zip codes, regions, or time zones. For example the user may search for media content available to a number of family members in order to send them a message indicating the channel and time that the other users may utilize to view the media content.

The reconciler database 218 is a database for storing the media content for a number of service providers, networks, users and other content generators. In one embodiment, the content reconciler 200 may feed information from the reconciler database 218 to a number of wireless devices, set-top boxes or other media platforms. As a result, the content reconciler 200 may perform the logical reconciliation of media content with vast processing and memory capabilities while minimizing the resources utilized by accessing devices to retrieve the information generated by the content reconciler 200.

Figure 3:
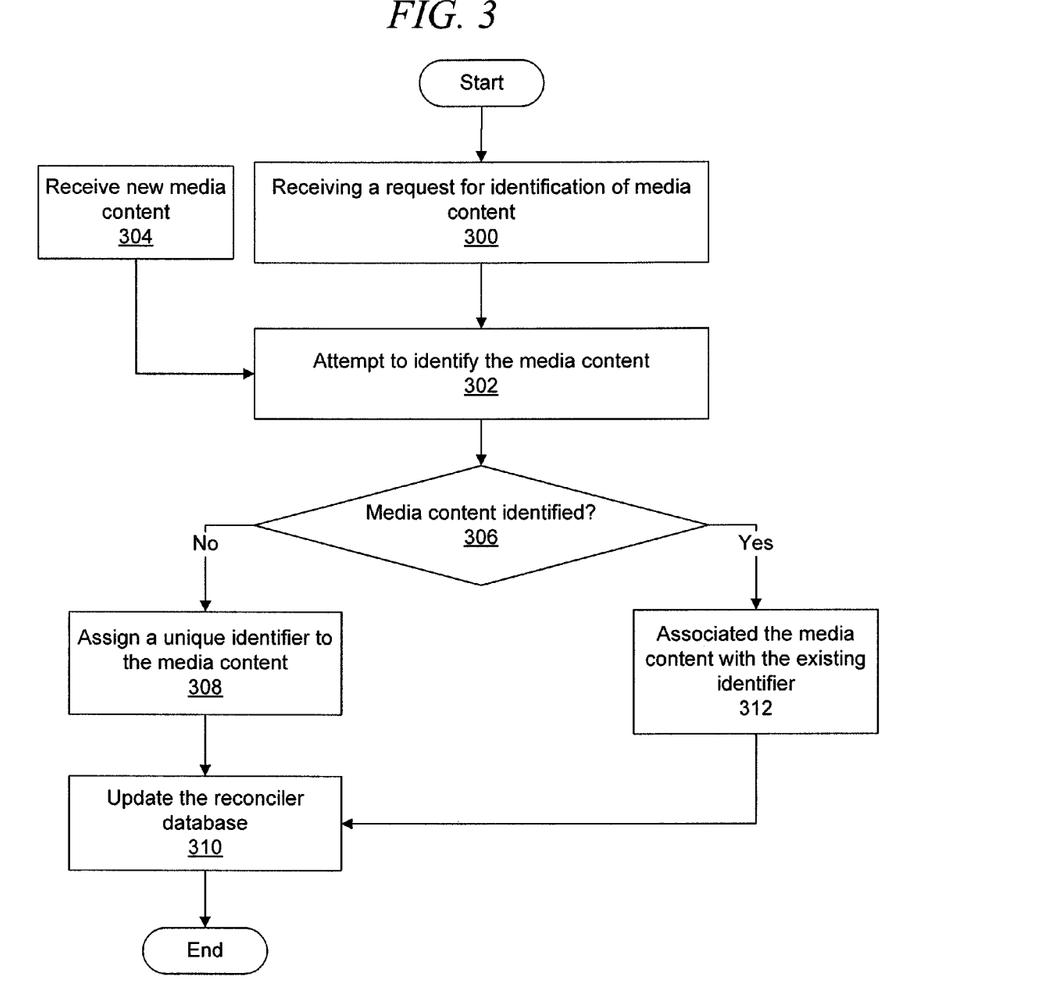
FIG. 3 is a flowchart of a process for identifying media content in accordance with an illustrative embodiment.

FIG. 3 is a flowchart of a process for identifying media content in accordance with an illustrative embodiment. The process of FIG. 3 may be implemented by a content reconciler in accordance with an illustrative embodiment. The content reconciler may be a server, database, mainframe computing system, distributing computing system, communications management system, or other devices, equipment, or systems.

The process may begin by receiving a request for identification of media content (step 300). The request may be generated by an individual user or multi-party systems such as a network, service provider, website or other entity. In one embodiment, the request may focus on a single piece of media content. For example, the request may identify a television program and a service provider of the user for reconciling the information for the user.

Next, the content reconciler attempts to identify the media content (step 302). The content reconciler may utilize one or more searches or queries to search for the media content. In one embodiment, the content reconciler identifies or attempts to identify unique characteristics of the media content which may include a name, title, duration, technical configuration (i.e., resolution, pixels), date, actors, subject, director, producer, digital rights management, copyright owner, distributor, digital fingerprint, metadata, and other similar characteristics that identify the content or content generator. In one embodiment, the content reconciler receives new media content (step 304). The new media content may be received through a periodic or other form of update or communication between the content reconciler and systems of one or more content generators. The content reconciler similarly attempts to identify the media content (step 302).

Next, the content reconciler determines whether the media content is identified (step 306). The determination of step 306 may be performed based on unique characteristics of the media content including meta tags, digital rights management, digital fingerprints, optical character and text recognition and other forms of recognizing files or media content as previously described. If the media content is not identified the content reconciler assigns a unique identifier to the media content (step 308). The unique identifier may be associated with the one or more characteristics of the media content. The unique identifier may be a content identifier that is not linked with a particular service provider or network thereby providing a universal point of access to the information in the content reconciler.

Next, the content reconciler updates a reconciler database (step 310). The database may be updated with the unique identifier, media content characteristics and other information. In some cases media content that was not previously recognized as new or unique may be reassigned an identifier. In one embodiment, updates to the reconciler database are immediately, periodically, or manually synchronized to other databases. For example, to better foster communications and sharing, the database may be copied by a number of social networks and other parties to ensure communications and discussions about media content are up to date.

In response to determining the media content is identified, in step 306, the content reconciler associates the media content with the existing identifier (step 312). The initial request generated may be based on a manual or automatic request to update media content. In one embodiment, the content reconciler may have permission to access the content guide and associated database of a service provider to identify or attempt to identify media content in the media guide for an upcoming time period.

Figure 4:
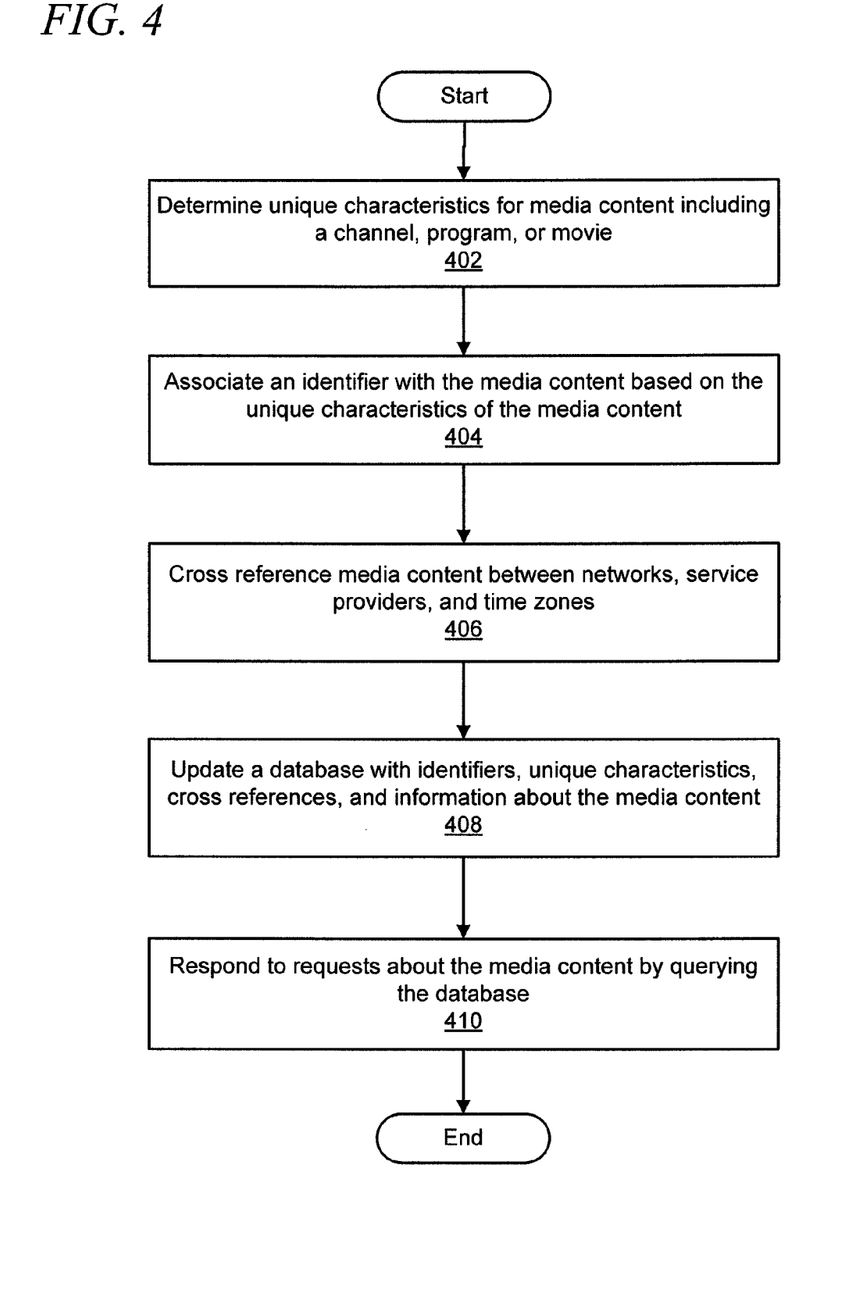
FIG. 4 is a flowchart of a process for reconciling media content in accordance with an illustrative embodiment.

FIG. 4 is a flowchart of a process for reconciling media content in accordance with an illustrative embodiment. The process of FIG. 4 may also be implemented for a content reconciler. The process may begin by determining unique characteristics for media content including a channel, program or movie (step 402). The media content may farther include slideshows, video clips, Pay-Per-View programming, news, events, MP3 files or other data that may be listened to or viewed by a user utilizing a display. The unique characteristics may be the digital or analog fingerprint or pattern for that media content. For example, all or a portion of the media content may be searched or analyzed to determine the unique characteristics.

Next, the content reconciler associates an identifier with the media content based on the unique characteristics of the media content (step 404). In one embodiment, the identifier is a 12 character reference including alphanumeric characters and common data processing symbols (i.e., *, !, #, @, and &). High definition and standard definition references may be correlated utilizing a naming scheme. For example, high definition media content may end with the characters HD whereas standard definition or other formats may utilize separate identifiers such as SD or other designators. In another embodiment, variations of a single piece of media content may also be linked. For example, individual network coverage of the State of the Union address may be associated utilizing a hyphen and then a number such as −1, −2, . . . −n.

Next, the content reconciler cross references media content between networks, service providers and time zones (step 406). The cross referencing may be performed automatically based on receiving or identifying media content. In another embodiment, the cross referencing may be performed based on a manual request to identify and cross reference media content.

Next, the content reconciler updates a database with identifiers, unique characteristics, cross references, and information about the media content (step 408). All of the information and details determined for the media content may be stored in the database for subsequent retrieval by one or more users. Next, the content reconciler responds to requests about the media content by querying the database (step 410). The requests may be responded to by providing information regarding a user, a service provider associated with a user and the time the media content may be played to the user based on their corresponding time zone, location and other user specific information. In some cases, the response may identify service providers and play dates and times for contacts or friends.

In one specific example, the content reconciler may be utilized for social networking communications. For example, users may send each other links to media content. In one embodiment, the links may be a request to view the media content. The request may also be an invitation that establishes a calendar entry indicating information for viewing or listening to the media content. The content reconciler may determine the service provider, time zone, programming selection, and other factors that influence when and whether the media content is available to each media content. The availability information may then be utilized to identify the media content and determine whether it is available to each individual contact. The applicable channel, time, and other relevant information may be identified for each contact. As a result, the media content may be cross-referenced based on availability for the one or more contacts. The cross-referencing information may be utilized to translate requests to view media content together.

The cross-referencing information may also be utilized for posts, messages, or discussions that are customizable for each user. For example, a link, invitation, or calendar entry sent through a social networking site may be automatically converted to include the correct information between a first contact and a second contact utilizing separate service providers that may also be in different time zones. The conversion may be performed based on custom fields or data stored within the user's profile. The cross-referencing may be performed automatically or based on a manual selection to identify the appropriate media content information for one or more contacts.

Figure 5:
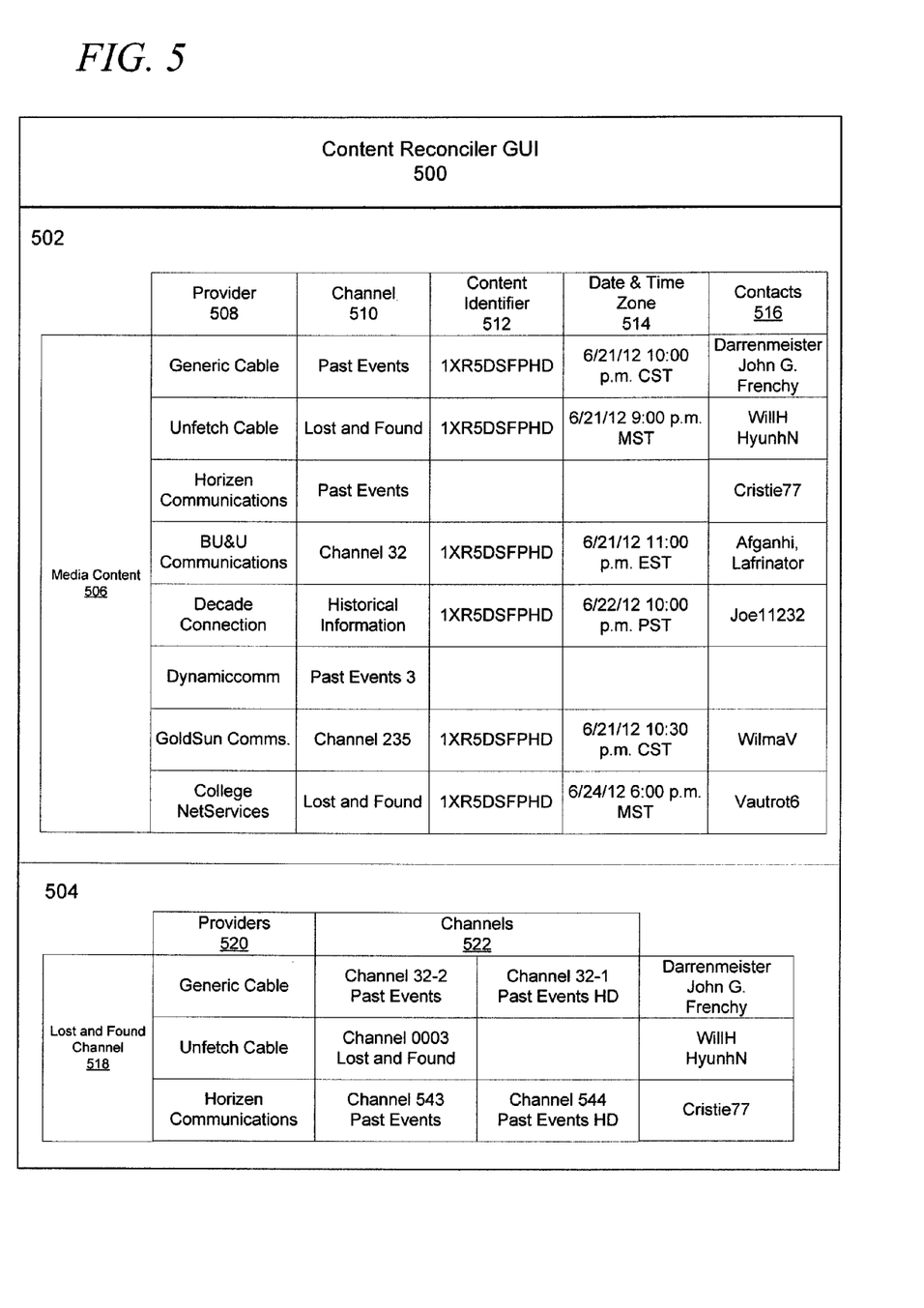
FIG. 5 is a pictorial representation of a graphical user interface for a content reconciler in accordance with an illustrative embodiment.

FIG. 5 is a pictorial representation of a graphical user interface for a content reconciler in accordance with an illustrative embodiment. FIG. 5 illustrates one example of a user interface 500 for a content reconciler graphical user interface (GUI). The user interface 500 may be a webpage displayed to a user, a screenshot of a webpage or interface displayed to a wireless device such as a cell phone, Blackberry, smart phone or laptop; a dedicated channel for displaying service provider information to a user, or any other number of interface elements. The user interface 500 may include section 502 and 504. Section 502 may further include media content 506, providers 508, channels 510, content identifier 512, date and time zones 514, and contacts 516. Section 504 may further include lost and found channel 518, providers 520, channels 522, and contacts 524. The media content 506 may be a particular program or viewable or audio element. For example, the media content 506 may be an episode of a popular competition reality show. The user may have an interest in the media content 506 and as a result may want to provide information to one or more other users and particularly individuals that may be included in the contacts 516. Each of the contacts 516 may have a user profile which may include location, service provider, and other details. For example, as part of the illustrative embodiments the profiles of many existing global contact lists, friends, groups, and other connections may be updated to include details of the service provider based on region, time zone and other similar information that may affect how and when media content is available to the contacts.

The providers 508 are the communications service providers associated with the various contacts 516. The channels 510 are the channels on which the media content 506 is, will, or has been played based on the providers 508. Although not explicitly shown herein the channels 510 may include multiple channels on which the media content may be played. The content identifier 512 is the unique identifier associated with the media content 506. In some cases standard and high definition versions of the media content 506 may have a similar number or identifier for making determinations and identifications more easy for users.

The date and time zones 514 specifies when the media content 506 is communicated to users or customers. For example, the date and time zones 514 illustrate a future date on which the media content 506 will be played to the corresponding providers 508 and channels 510. As previously mentioned the contacts 516 are the users, friends, family members or individuals specified by a user for identification and listing on the user interface 500. Section 502 may be applicable to individual sections of media content. Section 504 may be applicable to particular channels, podcasts, broadcasts or streams.

The providers 520 provide the individual communications service providers associated with the contacts 524. The channels 522 may provide standard definition and high definition channels associated with the lost and found channel 518. The user interface 500 may also be configured for utilization by operators or service providers. For example, if a user such as Jane wants to change from a first provider to a second provider she may want to verify that specific channels are included in a package or available through the service provider before she is willing to authorize a transition or switch between the first provider and second provider. Such determinations are particularly important for individuals that rely on or are dedicated to particular channels, content generators, stations, or other elements that may be identified by the user interface 500. The illustrative embodiments also provide a method of categorizing media content as it is generated for subsequent playback and record keeping.

The previous detailed description is of a small number of embodiments for implementing the invention and is not intended to be limiting in scope. The following claims set forth a number of the embodiments of the invention disclosed with greater particularity.

What is claimed:

1. A method for reconciling media content available through a plurality of service providers, the method comprising:
   receiving a request to identify media content from one of the plurality of service providers, wherein the request is received by a server;
   determining one or more characteristics of the media content;
   determining if the media content is associated with an identifier in response to the one or more characteristics;

automatically associating an identifier recognizable by the plurality of service providers with the media content in response to determining there is not an existing identifier associated with the media content;
automatically cross referencing the media content between the plurality of service providers in a database of the server, utilizing the identifier and time zones;
automatically updating the database of the server accessible to the plurality of service providers to include the identifier and the one or more characteristics associated with the media content;
receiving a request from a particular user of a plurality of users to invite one or more contacts associated with the particular user to view the media content;
based on the automatic cross referencing of the media content between the plurality of service providers, determining for each of the one or more contacts whether the media content is available to that particular contact based on profiles for each of the one or more contacts;
identifying at least one contact of the one or more contacts for whom the media content is available, based on the determination as to whether the media content is available for each of the one or more contacts;
sending an invitation to each of the at least one contact to view the media content together with the particular user, the invitation establishing a calendar entry indicating information for viewing the media content that is customized for the channel, date, time, and times zones that the media content is available for that particular contact of the at least one contact; and
filtering discussion of the media content on one or more social networks for the particular user and the at least one contact, until each of the particular user and the at least one contact has had an opportunity to view the media content.

2. The method according to claim 1, wherein the request is received from one of the plurality of users.

3. The method according to claim 2, wherein the one of the plurality of users is one of the plurality of service providers in communication with the server.

4. The method according to claim 1, wherein the one or more characteristics is information describing the media content.

5. The method according to claim 1, further comprising: analyzing the data included within the media content to determine a data signature.

6. The method according to claim 5, wherein the one or more characteristics include the data signature of the media content.

7. The method according to claim 1, wherein the media content is new media content submitted by a service provider in response to generating the media content.

8. The method according to claim 1, wherein the media content is a television show, movie, presentation, or media content.

9. The method according to claim 1, further comprising: associating the media content with the existing identifier in response to determining the media content has previously been assigned the existing identifier.

10. The method according to claim 1, wherein the media guide reconciles a plurality of media content utilizing a plurality of identifiers associated with the plurality of media content for the plurality of service providers.

11. The method according to claim 1, further comprising: displaying a message utilizing a social network indicating information for accessing the media content from the plurality of service providers.

12. The method according to claim 1, wherein the determining the one or more characteristics of the media content is performed by an administrator with access to review the media content.

13. A media content reconciler system comprising:
a processor;
a memory;
a network interface operable to receive a plurality of requests to identify a plurality of media content from a plurality of service providers;
reconciler logic in communication with the network interface and executable by the processor, the reconciler logic operable to determine one or more characteristics of each of the plurality of media content, determine if each of the plurality of media content is associated with an existing identifier in response to the one or more characteristics, associate an identifier recognizable by the plurality of service providers with the media content in response to determining there is no existing identifier associated with the media content, and cross reference the media content between the plurality of service providers in a database utilizing the identifier and time zones; and
a database in communication with the reconciler logic, the database is accessible by each of the plurality of service providers, the database is to store a plurality of identifiers, each of the plurality of identifiers is associated with one of a plurality of media content,
wherein the reconciler logic is operable to receive a request from a particular user of a plurality of users to invite one or more contacts associated with the particular user to view the media content, determine for each of the one or more contacts whether the media content is available to that particular contact based on profiles for each of the one or more contacts based on the automatic cross referencing of the media content between the plurality of service providers, identify at least one contact of the one or more contacts for whom the media content is available based on the determination as to whether the media content is available for each of the one or more contacts, and send an invitation to each of the at least one contact to view the media content together with the particular user, the invitation establishing a calendar entry indicating information for viewing the media content that is customized for the channel, date, time, and times zones that the media content is available for that particular contact of the at least one contact; and
wherein the media content reconciler system is configured to filter discussion of the media content for the particular user and the at least one contact on one or more social networks until each of the particular user and the at least one contact has had an opportunity to view the media content.

14. The media content reconciler system according to claim 13, wherein the database stores the one or more characteristics associated with each of the plurality of media content, and wherein the database updates a social network of a user with a media selection being watched by the user and a channel and time for a secondary user to view the media selection based on a service provider and a time zone of the secondary user.

15. The media content reconciler system according to claim 13, wherein the network interface responds to each of the plurality of requests identifying the plurality of media content, the associated identifier, and information for accessing each of the plurality of media content from the plurality of service providers.

16. The media content reconciler system according to claim 15, wherein the information includes a channel and a time.

17. The media content reconciler system according to claim 13, wherein the reconciler logic cross references standard definition versions and high definition versions of the media content.

18. A media content reconciler comprising:
a processor for executing a set of instructions; and
a memory for storing the set of instructions, wherein the set of instructions are executed to: receive a request to identify media content from one of a plurality of service providers, determine one or more characteristics of the media content, determine if the media content is associated with an existing identifier in response to the one or more characteristics, associate an identifier recognizable by the plurality of service providers with the media content in response to determining there is no existing identifier associated with the media content, cross reference the media content between the plurality of service providers in a database utilizing the identifier and time zones, update the database accessible to the plurality of service providers to include the identifier and the one or more characteristics associated with the media content, receive a request from a particular user of a plurality of users to invite one or more contacts associated with the particular user to view the media content, determine for each of the one or more contacts whether the media content is available to that particular contact based on profiles for each of the one or more contacts based on the automatic cross referencing of the media content between the plurality of service providers, identify at least one contact of the one or more contacts for whom the media content is available based on the determination as to whether the media content is available for each of the one or more contacts, send an invitation to each of the at least one contact to view the media content together with the particular user, the invitation establishing a calendar entry indicating information for viewing the media content that is customized for the channel, date, time, and times zones that the media content is available for that particular contact of the at least one contact, and filter discussion of the media content for the particular user and the at least one contact on one or more social networks until each of the particular user and the at least one contact has had an opportunity to view the media content.

19. The media content reconciler according to claim 18, wherein the media content reconciler communicates with a plurality of service providers and the plurality of users through one or more communications networks to display the guide that cross references the media content between the plurality of service providers, and wherein the media guide displaying a channel and time for the media content corresponding to each of the plurality of service providers and the time zones in response to the media content being available.

20. The media content reconciler according to claim 18, wherein the one or more characteristics are a data signature of the media content, and wherein the media content is a television show, movie, presentation, or media content.

\* \* \* \* \*